US012799776B2

(12) United States Patent
Debroucke et al.

(10) Patent No.: US 12,799,776 B2
(45) Date of Patent: Nov. 17, 2026

(54) VEHICLE DOOR LOCKING MECHANISM

(71) Applicant: Minebea AccessSolutions France, Alfortville (FR)

(72) Inventors: François Debroucke, Alfortville (FR); Jean-Baptiste Grislain, Alfortville (FR); Jean-Philippe Hochart, Alfortville (FR)

(73) Assignee: Minebea AccessSolutions France, Alfortville (FR)

( * ) Notice: Subject to any disclaimer, the term of this patent is extended or adjusted under 35 U.S.C. 154(b) by 0 days.

(21) Appl. No.: 18/885,832

(22) Filed: Sep. 16, 2024

(65) Prior Publication Data

US 2025/0092721 A1 Mar. 20, 2025

(30) Foreign Application Priority Data

Sep. 19, 2023 (EP) .................................... 23315361

(51) Int. Cl.
*E05B 79/22* (2014.01)
*E05B 85/06* (2014.01)
*E05B 85/20* (2014.01)

(52) U.S. Cl.
CPC .............. *E05B 79/22* (2013.01); *E05B 85/06* (2013.01); *E05B 85/20* (2013.01)

(58) Field of Classification Search
CPC .......... E05B 79/22; E05B 85/06; E05B 85/20; E05B 13/004; E05B 77/245; E05B 77/26; E05B 77/265
See application file for complete search history.

(56) References Cited

U.S. PATENT DOCUMENTS

| | | | | | |
|---|---|---|---|---|---|
| 91,116 | A | * | 6/1869 | Mellish | E05B 13/004 292/359 |
| 156,932 | A | * | 11/1874 | Lincoln | E05B 13/004 292/359 |
| 413,826 | A | * | 10/1889 | Hambujer | E05B 13/004 292/359 |
| 579,078 | A | * | 3/1897 | Randall | E05B 13/004 292/359 |
| 588,673 | A | * | 8/1897 | Wyman | E05B 13/004 292/359 |
| 613,169 | A | * | 10/1898 | Morris | E05B 13/004 292/359 |

(Continued)

FOREIGN PATENT DOCUMENTS

| | | | | |
|---|---|---|---|---|
| DE | 4127375 A1 | * | 2/1993 | E05B 77/24 |
| EP | 0892136 A1 | * | 1/1999 | E05B 81/40 |

(Continued)

*Primary Examiner* — Christine M Mills
*Assistant Examiner* — Faria F Ahmad
(74) *Attorney, Agent, or Firm* — Oblon, McClelland, Maier & Neustadt, L.L.P.

(57) ABSTRACT

A vehicle door locking mechanism includes a lock cylinder for locking or unlocking a vehicle door by rotating a control paddle linked to a door latch. The vehicle door locking mechanism also includes a slidable stopper which can be manually actuated from inside the door between a first position allowing rotation of the control paddle and a second position in which the stopper blocks rotation of the control paddle preventing therefore opening of the vehicle door from outside.

9 Claims, 4 Drawing Sheets

(56) References Cited

U.S. PATENT DOCUMENTS

| | | | | | |
|---|---|---|---|---|---|
| 933,630 | A * | 9/1909 | Curlett | E05B 13/004 292/359 |
| 1,500,490 | A * | 7/1924 | Gates | E05B 13/004 292/359 |
| 2,200,714 | A * | 5/1940 | Falk | E05B 13/004 292/359 |
| 2,234,912 | A * | 3/1941 | Falk | E05B 13/004 292/359 |
| 2,289,834 | A * | 7/1942 | Goldberg | E05B 13/004 292/359 |
| 2,442,763 | A * | 6/1948 | Falk | E05B 55/00 70/211 |
| 2,470,771 | A * | 5/1949 | Harvey | E05C 1/16 292/153 |
| 3,782,140 | A | 1/1974 | Price | |
| 4,142,748 | A * | 3/1979 | Hook | E05B 3/065 292/169.15 |
| 4,440,006 | A * | 4/1984 | Kleefeldt | E05B 77/48 292/DIG. 3 |
| 4,641,867 | A * | 2/1987 | Geringer | E05B 13/004 292/144 |
| 5,072,976 | A * | 12/1991 | Meszaros | E05B 13/004 292/359 |
| 5,676,409 | A * | 10/1997 | Trammell, Jr. | E05B 77/26 292/DIG. 31 |
| 5,738,394 | A * | 4/1998 | Arabia, Jr. | E05B 79/20 292/216 |
| 5,826,924 | A * | 10/1998 | Huang | E05B 13/004 70/483 |
| 6,644,077 | B1 * | 11/2003 | Huang | E05B 65/0035 70/489 |
| 11,280,116 | B2 * | 3/2022 | Scarfone | E05B 15/008 |
| 2005/0093305 | A1 * | 5/2005 | Jackson | E05B 81/54 292/216 |
| 2014/0191516 | A1 * | 7/2014 | Badhya | E05B 55/005 292/145 |
| 2019/0316391 | A1 | 10/2019 | Bacon | |
| 2019/0352941 | A1 * | 11/2019 | Scarfone | E05B 15/04 |
| 2020/0157856 | A1 * | 5/2020 | Kim | E05B 77/26 |
| 2023/0112684 | A1 * | 4/2023 | Cetnar | E05B 81/06 70/278.7 |
| 2023/0313570 | A1 * | 10/2023 | Perkins | E05B 77/265 70/209 |

FOREIGN PATENT DOCUMENTS

| | | |
|---|---|---|
| JP | 60-123684 A | 7/1985 |
| JP | 62-135760 U | 8/1987 |

* cited by examiner

VEHICLE DOOR LOCKING MECHANISM

The invention relates to the field of vehicle doors locking mechanism to control the locking and unlocking of the door from inside in order to prevent the opening of the door from the outside. The invention also relates to vehicle doors comprising such locking mechanism.

It is known from the state of the art, to provide a night lock system for a vehicle door which prevents break-ins, theft or invasion of the privacy of a driver inside the vehicle. The night lock system comprises a mechanical lock, in general a hardened pin, which can be mounted on an inner panel of the door. When activated, the mechanical lock blocks the door, preferably by inserting the pin around or into the armrest of the door, to prevent someone else from opening the door from outside.

However, such a night lock system is usually sold separately, in preference as an accessory which can be mounted on the door panel by the driver himself, and can require specific interfaces to be correctly installed.

Such a night lock system is usually appreciated in a double-crew vehicle, advantageously heavy-duty trucks, wherein the truck drivers take turn to rest inside the vehicle when said vehicle is required to stay stationary.

In general, both drivers have an authorised key adapted to open the vehicle door. At times, it may occur that one driver is resting inside the vehicle while the other driver uses his authorised key and by mistake invades the privacy of the resting one.

Since this night lock is not connected to the latching mechanism of the door, if not installed correctly, the risk of violation remains.

The purpose of the invention is to provide a vehicle door locking mechanism which is integrated in the vehicle door latching mechanism, to prevent the opening or mechanically unlocking of the vehicle from outside, even in case an individual is in possession of an authorized key to unlock the door.

To that end, the invention is directed towards a vehicle door locking mechanism comprising a lock cylinder for locking or unlocking a vehicle door by rotating a control paddle linked to a door latch, the vehicle door locking mechanism comprises a slidable stopper which can be manually actuated from inside a passenger cabin between a first position allowing rotation of the control paddle and a second position in which said stopper blocks rotation of the control paddle preventing therefore opening of the vehicle door from outside.

Thanks to the slidable stopper, the rotation of the control paddle can be prevented so that it is not possible to unlock the latch by rotation of the locking cylinder even if an authorised key is inserted in the lock cylinder. Hence, the rotation of the lock cylinder is prevented at the same time as the opening of the door from outside.

The vehicle door mechanism may further present one or more of the following characteristics, taken separately or in combination.

The door latch may comprise a control lever for unlocking the latch and the control lever is for example linked to the control paddle of the cylinder and the stopper may be in contact with the control lever of the latch in said second position.

The lock cylinder is, for example, provided with a key hole into which a key may be introduced and rotated to actuate the rotation of the control paddle.

The control paddle may be linked to the control lever in a rotation manner, for example by means of a rod or a cable, for example a Bowden cable. The control lever may therefore be rotated between a locking position and an unlocking position of the vehicle door by the rotation of the key.

The locking mechanism may allow locking of the door by a clockwise rotation of the control paddle or by an anti-clockwise rotation.

When the stopper is moved into its second position, the stopper may be placed next to the control lever by providing a resistive force to counteract the rotative force transmitted to the control lever. By counteracting on the control lever, the stopper may also indirectly counteract the rotation of the control paddle. Therefore, even though an authorized key is introduced in the keyhole, the control paddle cannot be rotated to unlock the vehicle door and consequently 30 the control lever cannot be rotated to unlock the latch. Hence, in the second position of the stopper, the vehicle door can neither be unlocked and nor can it be opened.

By the term "next to" it is understood that the stopper may be placed in a way to come into contact with the control lever in order to intercept the rotation pathway of the control lever. Therefore, irrespective of the clockwise or anticlockwise rotation of the key, the stopper may be arranged to intercept the rotation of control lever and hence may indirectly block the rotation of the control paddle.

The door latch and the stopper may be housed in a common housing.

The stopper may be mounted in or on the housing of the door latch so as to be integrated in the locking mechanism of the latching mechanism.

The stopper is integrated to the door latch in such a way that it may interact directly with the control lever of the door latch, in order to prevent unlocking of the latch so that there is no need to use any additional safety lock, such as an additional night lock, when a driver wants to keep his privacy. The stopper ensures the locking of the vehicle door and at the same time ensures that the latch cannot be moved to open the door.

The control lever rotates according to a rotational axis, the stopper is configured to slide along a linear pathway which is parallel to the rotational axis of the control lever.

Thanks to its linear parallel movement, the stopper is arranged to intercept the rotational pathway of the control lever by providing an optimal counterforce preventing unlocking the door latch.

The vehicle door locking mechanism may further comprise cooperating indexing elements disposed on the slidable stopper on the one side and the housing on the other side.

The cooperating indexing elements may provide haptic feedback of the sliding positions of the stopper to inform the user the state in which the stopper is placed.

The first position allowing rotation of the control lever may correspond to a rest state of the stopper. The second position blocking the rotation of the control lever may correspond to an active state of the stopper in which said stopper may interact with the control lever.

Preferably, the cooperating indexing elements may comprise at least two notches provided on the stopper, and a flexible tab provided on the housing. The flexible tab may be configured to be snap-fitted into one of the notches according the desired position of the sliding stopper.

The stopper may comprise a blocking portion which may be configured to intercept the control lever of the latch in said second position.

It may be understood here that when the stopper is moved to the second position, the blocking portion may come in contact with the control lever in order to provide a resistive force against the rotative force of the lever.

The blocking portion may present a «T»-cross section, where the base of the «T» may protrude towards the control lever of the latch for providing a resistive force against rotation of the control lever.

For example, the blocking portion may present a parallelepiped block, preferably a flat block presenting a flat surface provided with a rib protruding perpendicularly with respect to the flat surface to form the «T»-cross section. The rib may be configured to come in contact with the control lever to oppose its rotational motion by providing a resistive force. Optionally, the blocking portion can present any other form having a «T»-cross section.

The stopper may comprise a gripping portion extending outwardly from the housing to be gripped by a user.

The gripping portion can extend out from the housing and may be accessible from inside the vehicle door for ergonomic holding.

For example, the gripping portion may be connected to the blocking portion via a shaft. The gripping portion can be presented in the form of a push-button which, upon actuating, May cause the stopper to slide between the first and second positions.

Optionally, the gripping portion can be presented in the form of a rotating knob provided with a threaded bore cooperating with a threaded path advantageously formed on the shaft. Such a knob can be manually rotated by an appropriate angle in clockwise or anti-clockwise directions for pushing and pulling the shaft which in consequence allows the stopper to slide between the first and second positions. For example, the knob can be rotated by a quarter turn or a half turn or a full turn.

BRIEF DESCRIPTION OF THE FIGURE

The invention will be better understood and other characteristics and advantages will appear at the reading of the following description, given in an illustrative and non-limiting fashion, referring to the annexed figures in which.

DETAILED DESCRIPTION

A vehicle door locking mechanism 100 will be described with reference to FIGS. 1 to 7*e*. The vehicle door locking mechanism 100 is provided inside a vehicle door 1 of a vehicle as illustrated in FIG. 1, for example a truck door or an automobile vehicle door.

The present invention is in particular appreciated in a double-crew vehicle wherein at least two drivers have an authorized key. In the present description, it is understood that an authorized key can be a mechanical and/or an electronic key with remote control or handless access. The vehicle door locking mechanism 100 is advantageously configured to prevent one driver from invading the privacy of the other driver who is resting inside the passenger cabin although he has an authorized key.

Figure 1:
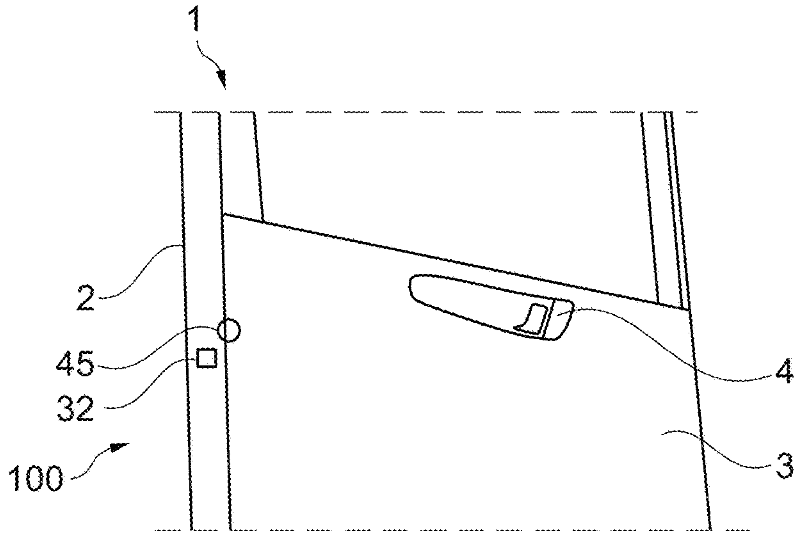
FIG. 1 is an inside view of a vehicle door comprising a vehicle door locking mechanism

The vehicle door 1 in FIG. 1, comprises an outer panel 2 and an inner panel 3 between which the vehicle door locking mechanism 100 is arranged. In this view, the vehicle door locking mechanism 100 is only partially visible.

FIG. 1 shows partially a rotary latch fork 32 provided on a lateral side of the vehicle door 1, said latch fork 32 can rotate in a way to be reversibly engaged in a not shown door striker formed on a door frame of the vehicle door 1 for opening or closing the door 1. The latch fork 32 can be actuated by a door handle 4 provided inside the door or a door handle 5 provided outside the door (not visible on FIG. 1). When the latch fork 32 is engaged in the door striker, the door 1 is maintained closed, and when either one of door handles 4, 5 is actuated the latch fork 32 is released from the door striker to allow opening of the door 1.

FIG. 1 also shows a gripping portion 45 of a stopper 40 (the stopper 40 is shown in more detail in FIGS. 3-7*e*), which is provided protruding from the inner panel 3 of the vehicle door 1 while the stopper penetrates in the space provided between the outer 2 and inner 3 panels. The gripping portion 45 provides an ergonomic holding for a driver and can be manually actuated from inside the passenger cabin to block the release of the latch fork 32 and thus prevent opening of the door 1 from outside even with an authorized key. This operation will be further described in the following paragraphs. 20

Figure 2:
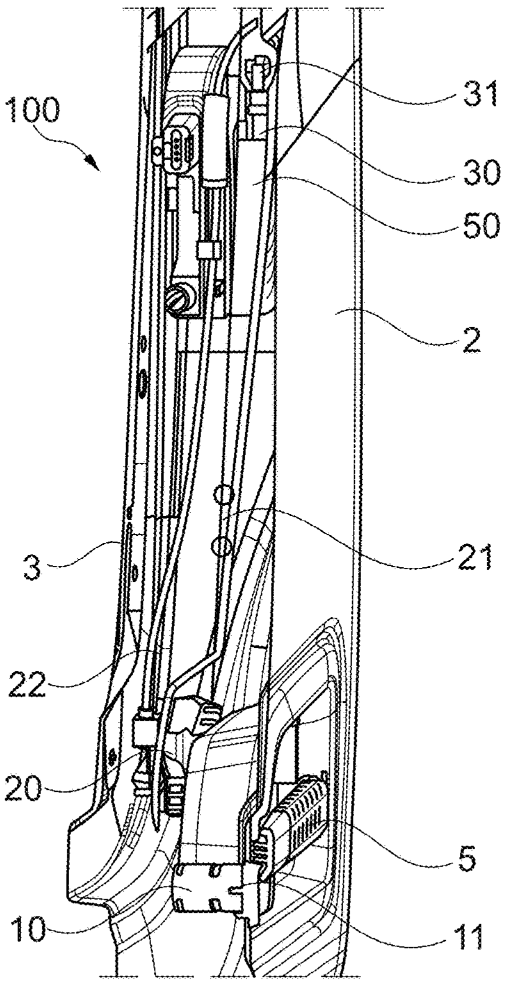
FIG. 2 is a cross-section view of a similar door comprising an exemplary embodiment of the present disclosure.

FIG. 2 illustrates an exemplary embodiment of the vehicle door locking mechanism 100 arranged between the outer panel 2 and an inner panel 3 of the vehicle door 1. The vehicle door locking mechanism 100 comprises a lock cylinder 10, a control paddle 20 and a door latch 30.

The lock cylinder 10 includes an outer face provided with a key hole 11, and an inner face which is connected to the control paddle 20. The key hole 11 is accessible from the outer panel 2 to allow introduction of an authorized key which can be rotated to actuate the rotation of the control paddle 20 for locking or unlocking the vehicle door 1.

The door latch 30 comprises a control lever 31 mounted on a housing 50 of the door latch 30 for unlocking the door latch 30. By unlocking the door latch 30, the latch fork 32 shown in FIG. 1, can be released from the striker to allow opening the vehicle door 1 upon actuation of the door handle 4, 5.

As shown on FIG. 2, the outer door handle 5 is linked to the door latch 30 by means of a Bowden cable 22. The outside handle 5 can be optionally linked to the door latch 30 by other means. More precisely, the Bowden cable 22 allows a mechanical connection between the outside handle 5 and the latch fork 32 to allow opening of the vehicle door 1 upon actuation of the handle 5.

Furthermore, on FIG. 2, the control paddle 20 is linked to the control lever 31 in a rotational manner by means of a rod 21. Optionally, the control lever 31 can be linked to the control paddle 20 by other means, for example also through a Bowden cable. Hence, a mechanical connection is established between the control paddle 20 and the control lever 31 so that the rotation of the control paddle 20 can control the rotation of the control lever 31.

Figure 3:
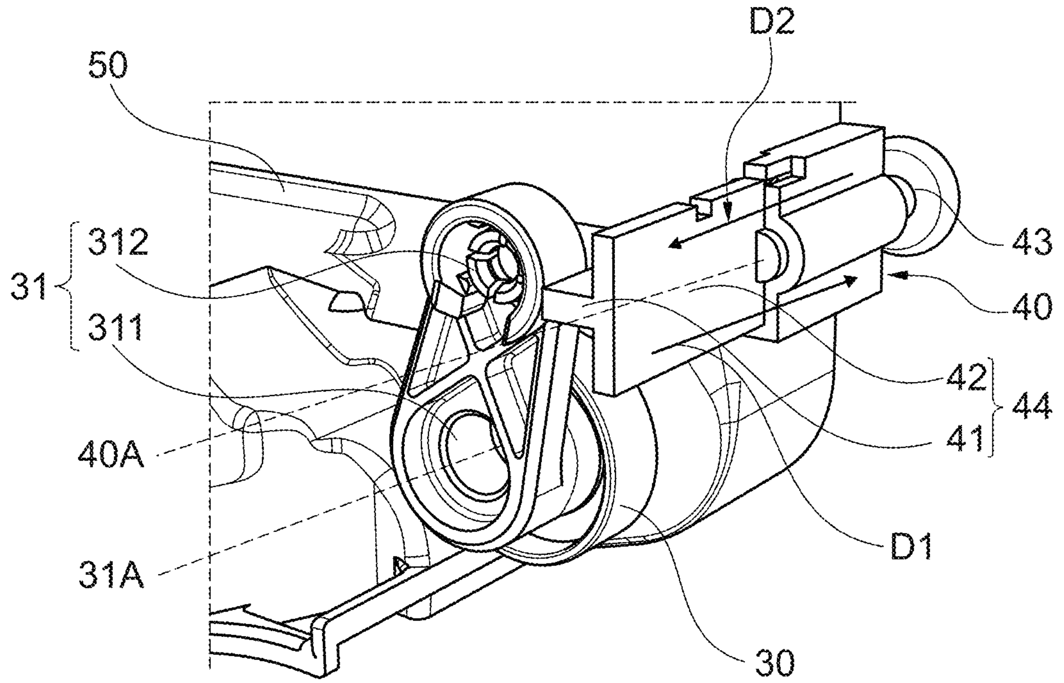
FIG. 3 is a perspective view of a stopper in contact with a control lever of a door latch according to an exemplary embodiment of the present invention.

Referring to FIG. 3, the control lever 31 presents a base body 311 pivotably mounted on the housing 50 of the door latch 30. The base body 311 comprises a distal end provided with a port 312 into which one end of the rod 32 shown in FIG. 2 can be engaged to cause rotation of the control lever 31. The control lever 31 can rotate according to a rotational axis 31A to allow unlocking of the door latch 30. Such a rotation may generate a torque to unlock the door latch 30.

Therefore, upon rotation of the control paddle 20, the control lever 31 can also be rotated according to its rotational axis 31A for unlocking the latch 30.

FIG. 3 also shows the stopper 40 mentioned above, which is placed between the outer panel 2 and inner panel 3 of the vehicle door 1. The stopper 40 is slidably mounted on the housing 50 of the door latch 30 and can be moved between a first and a second positions. In particular, the first position where the stopper is pulled in direction D1 of the passenger cabin, allows rotation of the control paddle 20, and the second position which is shown in FIG. 3 and corresponds to a pushed position in an opposite direction D2, blocks the rotation of the control paddle 20 to prevent opening of the vehicle door 1 from the outside. This operation is going to be further explained in the following paragraphs.

The stopper 40 is configured to slide along a linear pathway 40A between the first and second positions, this linear pathway 40A is parallel to the rotational axis 31A of the control lever 31.

By housing the stopper 40 in the same housing 50 as the door latch 30 and thanks to its linear parallel pathway, the stopper 40 is able to interact directly with the control lever 31 in order to intercept its rotational pathway. Therefore, there is no need to use any additional safety lock, such as an additional night lock, when a driver wants to keep his privacy.

The slidable stopper 40 comprises a blocking portion 44 which is configured to intercept the control lever 31 of the door latch 30 in the second position. FIG. 3 shows the stopper 40 in the second position wherein said stopper is placed in contact with the control lever 31.

By being in contact with the control lever 31, the stopper 40 can provide a resistive force to counteract the rotative force of the control lever 31 in order to block the rotation of the control lever 31 preventing it from unlocking the door latch 30 and hence to prevent opening of vehicle door 1 when either one of the inner 4 or outside handle 5 is actuated.

By blocking the rotation of the control lever 31, the stopper 40 can also indirectly block the rotation of the control paddle 20 due to the mechanical connection established by the rod 21 shown in FIG. 2. Therefore, even though an authorized key is introduced in the keyhole 11, the control paddle 20 cannot be rotated to unlock the vehicle door 1 and consequently the control lever 31 cannot be rotated either to unlock the latch 30.

In particular the latch 30 may comprise electrical actuators which may be controlled by a remote key, not shown, activated by a driver through a remote control. In case a remote control is used to unlock the vehicle door 1, the fact that the control lever 31 is blocked also prevents unlocking of the latch 30 by the remote key.

Hence, in the second position of the stopper 40, the vehicle door 1 can neither be unlocked and nor can it be opened.

Figure 4A:
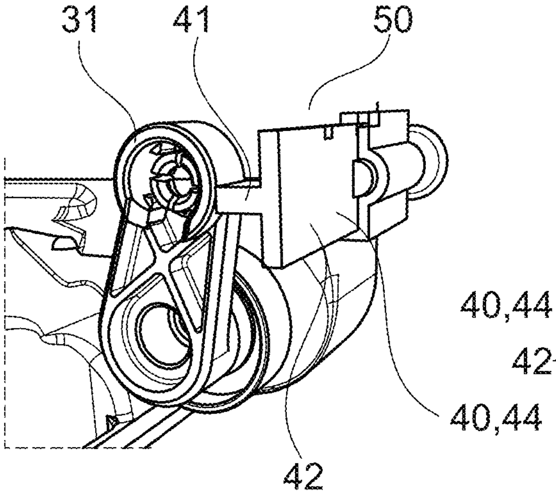
FIGS. 4*a* and 4*b* are perspective views of a stopper in contact with a control lever of a door latch according to the clockwise or anti-clockwise rotation of the control lever.

Depending on the door (right or left door) on which it is mounted, the control paddle 20 can be configured to be rotated in a clockwise direction for locking the door 1, or configured to be rotated in an anticlockwise direction. The stopper 40 is ideally placed to intercept the rotational pathway of the control lever 31. FIG. 4*a* shows a stopper 40 whose blocking portion 44 is arranged to block a control lever 31 having a clockwise 35 rotational pathway and FIG. 4*b* shows a blocking portion 44 arranged to block a control lever 31 with an anticlockwise rotational pathway.

Figure 4B:
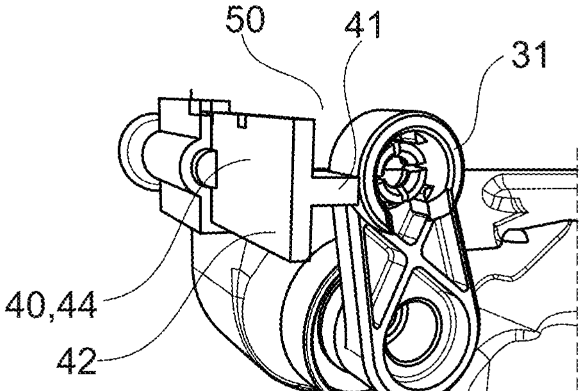

As shown in FIGS. 3, 4*a* and 4*b*, the blocking portion 44 presents a «T»-cross section, where the base of the «T» protrudes towards the control lever 31 of the latch 30 for providing a resistive force against rotation of the control lever 31.

The illustrated blocking portion 44 presents a parallelepiped flat block 42 presenting a flat surface provided with a rib 41 protruding perpendicularly with respect to the flat surface to form the «T»-cross section. The rib 41 is placed in contact with the control lever 31 to oppose its rotational motion by providing a resistive force.

Figure 5:
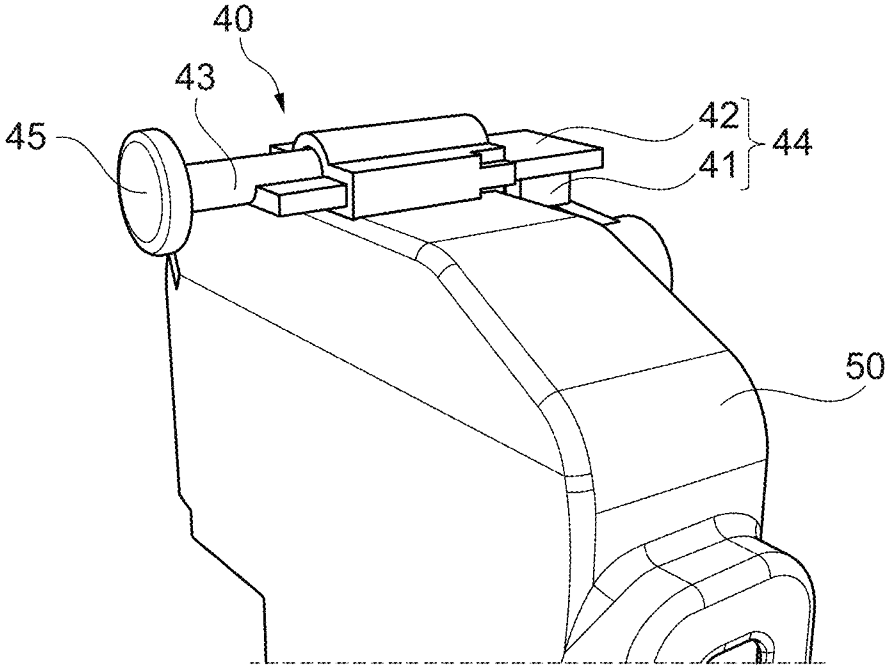
FIG. 5 is a perspective view of the stopper according to an exemplary embodiment of the present invention

Referring to FIG. 5, the stopper 40 is fully represented with the gripping portion 45 also illustrated in FIG. 1. The gripping portion 45 extends outwardly from the housing 50 to be gripped by a user, the gripping portion 45 is accessible from the inside the passenger cabin on the inner side of the vehicle door 1 as shown in FIG. 1, notably for a driver inside the vehicle who wishes to have privacy.

The gripping portion 45 is connected to the blocking portion 44 via a shaft 43 facilitating the sliding motion of the stopper 40. The gripping portion 45, in FIG. 5, is presented in the form of a push-pull-button which, upon actuating, may cause the stopper 40 to slide between the first and second positions.

Optionally, the gripping portion 45 can be presented in the form of a rotating knob provided with a threaded bore cooperating with a threaded path advantageously formed on the shaft 43. Such a knob can be manually rotated by an appropriate angle in clockwise or anti-clockwise directions for pushing and pulling the shaft 43 which in consequence allows the stopper 40 to slide between the first and second positions. For example, the knob can be rotated by a quarter turn or a half turn or a full turn.

Figure 6A:
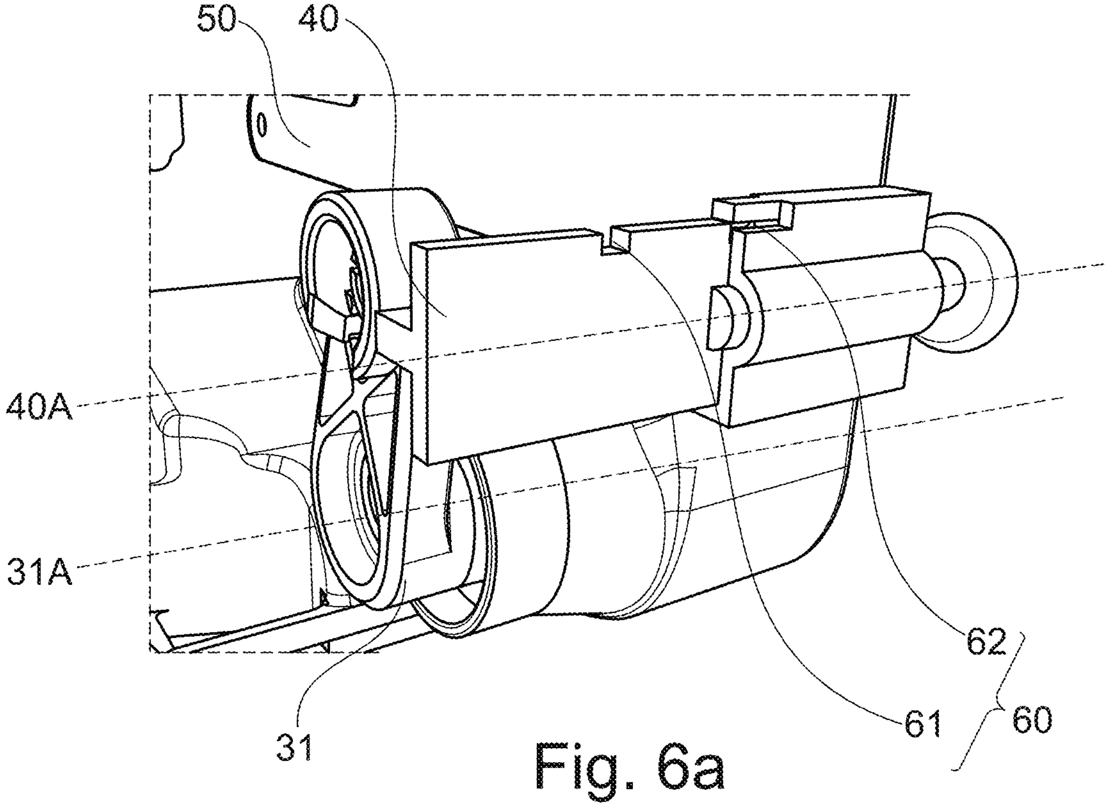
FIGS. 6*a* and 6*b* is a side view of a stopper mounted on a housing of the door latch, both provided with indexing elements according to an exemplary embodiment of the present invention.
Figure 6B:
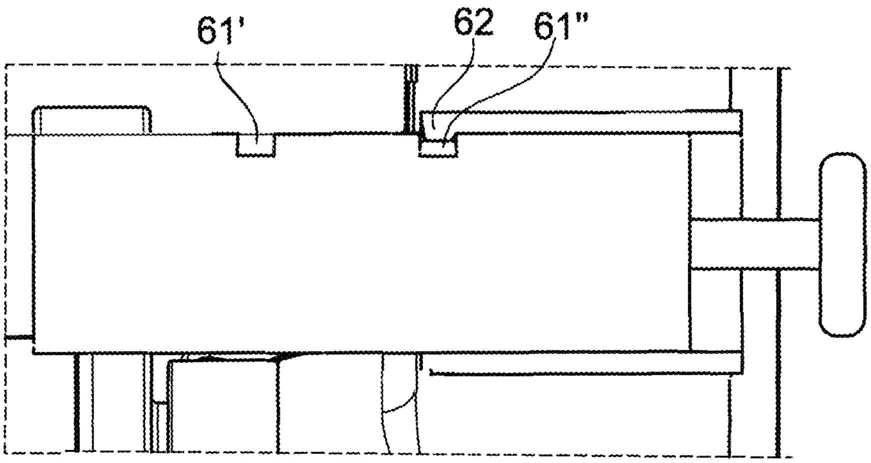

Referring to FIGS. 6*a* and 6*b*, the vehicle door locking mechanism 100 further comprises cooperating indexing elements 60 disposed on the slidable stopper 40 on the one side and the housing 50 on the other side to ensure that the stopper 40 stays put in a desired position.

The cooperating indexing elements 60 comprise two notches 61', 61" provided on the stopper 40, and a flexible tab 62 provided on the housing 50. The flexible tab 62 is configured to be snap-fitted into one of the notches 61', 61" according the desired position of the sliding stopper 40.

Theses indexing elements 60 can provide haptic feedback of the sliding positions of the stopper 40 to inform the user the state in which the stopper 40 is placed.

The first position allowing rotation of the control lever 31 may correspond to a rest state of the stopper 40. The second position blocking the rotation of the control lever 31 may correspond to an active state of the stopper 40 in which said stopper may interact with the control lever 31.

FIGS. 7*a*-7*e* represent different circumstances in which the vehicle door locking mechanism 100 can be subjected.

Figure 7A:
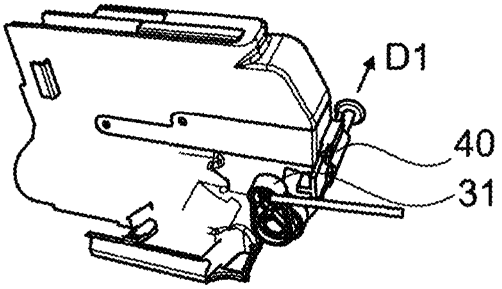
FIGS. 7*a*, 7*b*, 7*c*, 7*d*, and 7*e* are views of the vehicle door locking mechanism which is subjected to different circumstances.
Figure 7B:
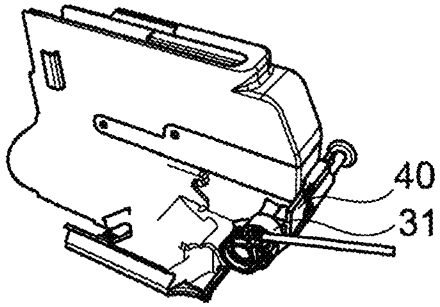

In FIGS. 7*a* and 7*b*, the stopper 40 is in the first position corresponding to a rest state wherein the stopper 40 is pulled towards the passenger cabin in direction D1 and, in preference the blocking portion 44, is not placed in contact with the control lever 31. FIGS. 7*a* and 7*b* show that the stopper 40 is placed out of the rotational pathway of the control lever 31, hence allows its rotation for unlocking the vehicle door 1 (FIG. 7*b*). In this position, the control paddle 20 can also be rotated using an authorized key, and opening of the door 1 is possible.

Figure 7C:
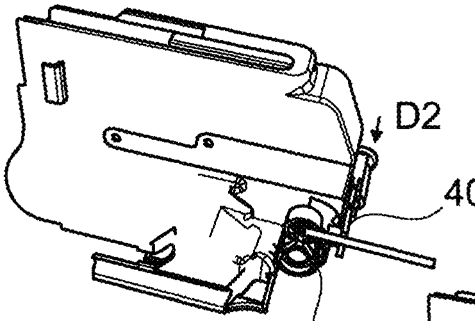
Figure 7D:
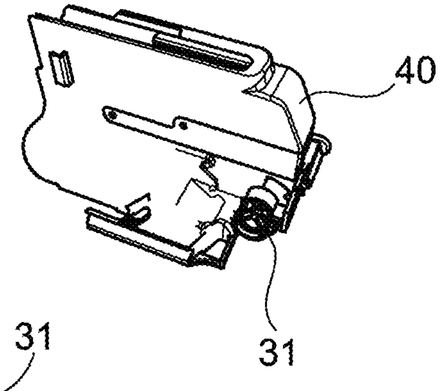

In FIGS. 7*c, ad*, and 7*e*, the stopper 40 is placed in the second position corresponding an active state wherein the stopper 40 is pushed in opposite direction D2 and, in preference the blocking portion 44, is in contact with the control lever 31 in order to intercept the rotational pathway of the control lever 31. As stated above, this is the «nightlock position» preventing anyone even with an authorized key (mechanical or remote) to unlock and open the door 1. In FIG. 7*c*, the stopper 40 is in contact with the control lever 31 and provides a resistive force to counteract the rotational force of the control lever 31. Therefore, unlocking of the vehicle door 1 is prevented, as well as its opening.

Figure 7E:
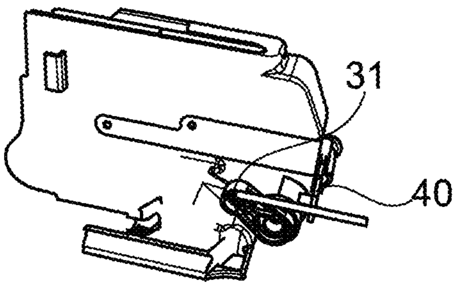

Though in the second position, the control lever 31 cannot be rotated to allow unlocking of the door, it can rotate in an opposite direction to allow locking of the vehicle door 1 from inside, as shown in FIG. 7*e*. For example, when a first driver wants his privacy while being inside the vehicle, he can slide the stopper 40 to the second position and additionally lock the door 1 from the inside for added safety.

LIST DE REFERENCES

100: Vehicle door locking mechanism
1: Vehicle door
2: outer panel
3: inner panel
4: inside door handle
5: outside door handle
10: lock cylinder
11: keyhole
20: control paddle
21: rod
22: Bowden cable
30: door latch
31: control lever
31A: rotational axis of control lever 31
311: base body
312: port
32: latch fork
40: stopper
40A: linear pathway of stopper
41: rib
42: flat block
43: shaft
44: blocking portion
45: gripping portion
50: housing
60: indexing elements
61', 61": notch
62: flexible tab
D1: pulled direction of the stopper 40
D2: pushed direction of the stopper 40

The invention claimed is:

1. A vehicle door locking mechanism comprising:
a lock cylinder configured to lock or unlock a vehicle door by rotating a control paddle linked to a door latch; and
a slidable stopper configured to be manually actuated from the inner side of the door between a first position allowing rotation of the control paddle and a second position in which said stopper blocks rotation of the control paddle to prevent opening of the vehicle door from outside even with an authorized key introduced in the lock cylinder.

2. The vehicle door locking mechanism according to claim 1, wherein the door latch comprises a control lever for unlocking the latch, the control lever is linked to the control paddle of the lock cylinder and the stopper is in contact with the control lever of the latch in said second position.

3. The vehicle door locking mechanism according to claim 2, wherein the door latch and the stopper are housed in a common housing.

4. The vehicle door locking mechanism according to claim 2, wherein the control lever rotates according a rotational axis, the stopper is configured to slide along a linear pathway which is parallel to the rotational axis of the control lever.

5. The vehicle door locking mechanism according to claim 3, further comprising cooperating indexing elements disposed on the slidable stopper on a first side and the housing on a second side.

6. The vehicle door locking mechanism according to claim 2, wherein the stopper comprises a blocking portion which is configured to intercept the control lever of the latch in said second position.

7. The vehicle door locking mechanism according to claim 6, wherein the blocking portion presents a T-shaped cross section, where a base of the T-shaped cross-section protrudes towards the control lever of the latch for providing a resistive force against rotation of the control lever.

8. The vehicle door locking mechanism according to claim 3, wherein the stopper comprises a gripping portion extending outwardly from the housing to be gripped by a user.

9. The vehicle door locking mechanism according to claim 1, wherein the control paddle is linked to the door latch by a rod positioned between the control paddle and the door latch.

* * * * *